United States Patent [19]

Melindo et al.

[11] 3,914,553

[45] Oct. 21, 1975

[54] MULTIPLEXING/DEMULTIPLEXING NETWORK WITH SERIES/PARALLEL CONVERSION FOR TDM SYSTEM

[75] Inventors: Flavio Melindo; Giovanni Perucca, both of Turin, Italy

[73] Assignee: CSELT-Centro Studi e Laboratori Telecomunicazioni SpA, Turin, Italy

[22] Filed: Sept. 23, 1974

[21] Appl. No.: 508,612

[30] Foreign Application Priority Data

Sept. 24, 1973 Italy .................................. 69793/73

[52] U.S. Cl... 179/15 AT; 179/15 AQ; 340/347 DD

[51] Int. Cl.[2] ........................................... H04J 3/00

[58] Field of Search....... 179/15 AT, 15 AL, 18 GF, 179/15 BW; 340/172.5, 347 DD; 235/92 SH

[56] References Cited

UNITED STATES PATENTS

| | | | |
|---|---|---|---|
| 3,263,030 | 7/1966 | Stiefel | 179/15 AT |
| 3,705,266 | 12/1972 | Philip | 179/15 AT |
| 3,736,381 | 5/1973 | Johnson et al. | 179/15 AT |

*Primary Examiner*—Kathleen H. Claffy
*Assistant Examiner*—Thomas D'Amico
*Attorney, Agent, or Firm*—Karl F. Ross; Herbert Dubno

[57] ABSTRACT

A PCM/TDM terminal has *m* parallel receiving lines and *m* parallel transmitting lines for recurrent sequences of *n* words, of *m* bits each, originating at or destined for *n* channels connectable to that terminal by way of two alternately operating conversion units. Each conversion unit comprises an orthogonal matrix of *m.n* register stages for individual bits, divided into *m* columns and *n* rows, the first unit communicating with the channels while the second unit communicates with the terminal and vice versa. In an alternation of switching phases whose duration equals the time period occupied by an *m*-bit word serially arriving or departing over any channel, the unit communicating with the channels has its *n* row inputs and its *n* row outputs respectively connected to the incoming and outgoing channel branches while the unit communicating with the terminal has its *m* column inputs and its *m* column outputs respectively connected to the transmitting and receiving terminal lines. Thus, in a first phase the first unit stores in its *n* rows the bits of as many words arriving over the incoming channel branches and, simultaneously, reads out to the outgoing channel branches the bits of *n* words previously receiving from the terminal; at the same time the second unit stores in its *m* columns the bits of *n* successive words coming from the terminal and reads out to the terminal the bits of as many words previously fed in by the channels. In a second phase the roles of the two units are reversed.

6 Claims, 3 Drawing Figures

MULTIPLEXING/DEMULTIPLEXING NETWORK WITH SERIES/PARALLEL CONVERSION FOR TDM SYSTEM

FIELD OF THE INVENTION

Our present invention relates to a multiplexing-/demultiplexing network for a telecommunication system of the pulse-code-modulation (PCM) type.

BACKGROUND OF THE INVENTION

In communication systems of this nature, operating on the time-division-multiplex (TDM) principle, messages arriving in the form of binary words at a local terminal from a multiplicity of channels are to be interleaved in a message frame to be transmitted to a remote terminal, via a trunk line or other communication link, for distribution to other channels. Conversely, message frames coming in from the remote terminal are demultiplexed at the local terminal for distribution over outgoing branches of the associated channels. Generally, the channels converging at a given terminal operate at the same bit rate and carry words consisting of the same numbers $m$ of serially transmitted bits. The time period occupied by such an $m$-bit word equals the duration of a message frame whose bits are therefore serially transmitted at a rate substantially higher than the bit rate of the channels.

For the multiplexing and demultiplexing operations it is usually convenient to feed the serially arriving bits of a word of any channel in parallel into $m$ receiving lines of the terminal and to provide a like number of transmitting lines for the bits of any word in an incoming message frame which is to be delivered to a local channel. Thus, circuits must be inserted between these channels and the terminal for converting the series bits of a parallel group of $m$-bit words, arriving simultaneously over the incoming branches of $n$ channels, into parallel bits of an $n$-word sequence delivered to the receiving lines of the terminal and, analogously, to convert the parallel bits of an arriving $n$-word sequence, appearing on the $m$ transmitting lines of the terminal, into a parallel group of $m$-bit words simultaneously fed to the outgoing branches of the same $n$ channels. In the prior art, series/parallel conversion and multiplexing was carried out with the aid of a pair of cascaded registers while demultiplexing and parallel/series conversion was performed by another such register pair. Such an arrangement is relatively complex and costly; moreover, its operation is not very economical inasmuch as the registers are utilized only part of the time and are idle for considerable portions of a cycle.

OBJECTS OF THE INVENTION

It is, therefore, the general object of our present invention to provide simplified multiplexing/demultiplexing means for a communication system of the character set forth, with avoidance of the aforestated drawbacks.

A more particular object is to provide combined conversion and multiplexing/demultiplexing means which can be easily modified to accommodate different numbers $m$ of bits per word or $n$ of channels served thereby.

A further object is to provide a method of carrying out series/parallel conversions and multiplexing/demultiplexing operations at a faster rate than has been possible with conventional circuitry used for this purpose.

SUMMARY OF THE INVENTION

We realize these objects, in accordance with our present invention, by the provision of a first and a second conversion unit each including an orthogonal matrix of $m{\cdot}n$ register stages divided into $m$ columns and $n$ rows, each stage being adapted to store one bit. A timing circuit establishes a continuous sequence of alternating first and second switching phases, of a duration equaling the time period occupied by an $m$-bit word transmitted or received over any of the associated channels, and also controls a switchover circuit serving to establish one mode of connection for the first unit and another mode of connection for the second unit during the first switching phase and for reversing the roles of these units in the second switching stage. Thus, in the first phase the switchover circuit connects the $n$ row inputs of the first unit to the incoming channel branches and the $n$ row outputs of the same unit to the outgoing channel branches while connecting the $m$ column inputs of the second unit to the transmitting lines and the $m$ column outputs of the latter unit to the receiving lines of the terminal; in the second phase the $m$ column inputs and column outputs of the first unit are respectively connected to the transmitting and receiving lines of the terminal while the $n$ row inputs and row outputs of the second unit are respectively connected to the incoming and outgoing channel branches. With the aid of transfer means in each unit, including interstage connections and stepping inputs for the individual stages, the $m$ bits stored in each row thereof are serially read out to the outgoing channel branches concurrently with a progressive loading of the stages of these rows with the bits of newly arriving words from the incoming channel branches during one switching phase (i.e. the first phase in the case of the first unit and the second phase in the case of the second unit) whereas the $n$ bits stored in each column thereof are serially read out to the receiving lines of the terminal concurrently with a progressive loading of the stages of these columns with corresponding bits of an $n$-word sequence from the associated transmitting lines during the other switching phase (i.e. the second phase in the case of the first unit and the first phase in the case of the second unit).

BRIEF DESCRIPTION OF THE DRAWING

The above and other features of our invention will now be described in detail with reference to the accompanying drawing in which.

SPECIFIC DESCRIPTION

Figure 1:
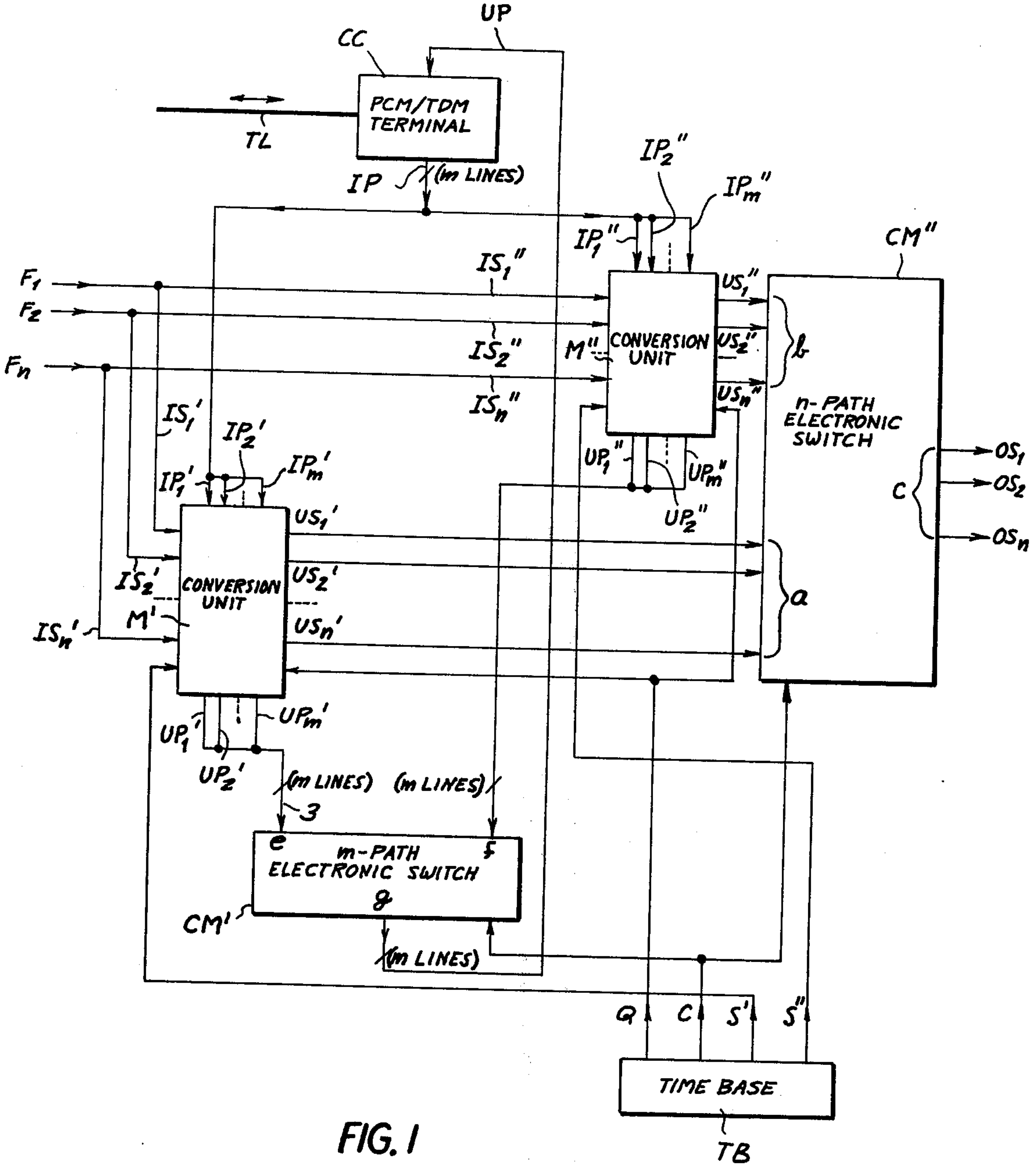
FIG. 1 is an overall block diagram of a junction between a TDM terminal and a multiplicity of associated channels in a PCM system embodying our invention.

The PCM/TDM telecommunication system shown in FIG. 1 comprises a set of channels with incoming branches $F_1, F_2, \ldots F_n$ and outgoing branches $OS_1, OS_2, \ldots OS_n$. A terminal CC, with conventional equipment (not shown) for grouping a sequence of $m$-bit words into a departing message frame and extracting a similar word sequence from an arriving message frame, has a multiple of $m$ receiving lines UP and a multiple of $m$ transmitting lines IP for the bits of each word in such a sequence. Two identical conversion units M′ and M″, more fully described hereafter with reference to FIG. 2, have respective column inputs $IP_1'$, $IP_2'$, . . . $IP_m'$ and $IP_1''$, $IP_2''$, . . . $IP_m''$ connected (in parallel pairs) to the transmitting multiple IP as well as respective row inputs $IS_1'$, $IS_2'$, . . . $IS_n'$ and $IS_1''$, $IS_2''$, . . . $IS_n''$ similarly connected to incoming channel branches $F_1$, $F_2$, . . . $F_n$. Column outputs $UP_1'$, $UP_2'$, . . . $UP_m'$ of unit M′ and column outputs $UP_1''$, $UP_2''$, . . . $UP_m''$ of unit M″ are alternately connectable to receiving lines UP via an *m*-path electronic switch CM′ with two input multiples *e* and *f* connectable to an output multiple *g* in a first and a second switch position, respectively. Similarly, row outputs $US_1'$, $US_2'$, . . . $US_n'$ of unit M′ and row outputs $US_1''$, $US_2''$, . . . $US_n''$ of unit M″ are alternately connectable to outgoing channel branches $OS_1$, $OS_2$, . . . $OS_n$ via another *m*-path electronic switch CM″ with two input multiples *a* and *b* connectable to an output multiple *c* in a first and a second switch position, respectively.

A time-base circuit TB establishes a switching cycle divided into two equal phases as more fully described below with reference to FIG. 3. The switchover from one phase to the other is controlled by a square wave on a lead C extending to the two switches CM′ and CM″. Leads S′ and S″ carry selection pulses, synchronized with the half-cycles of the square wave C, to units M′ and M″ for the control of internal switching operations. Circuit TB also emits, during each switching phase, a transfer or clock pulse on a lead Q extending to both units M′ and M″.

Figure 2:
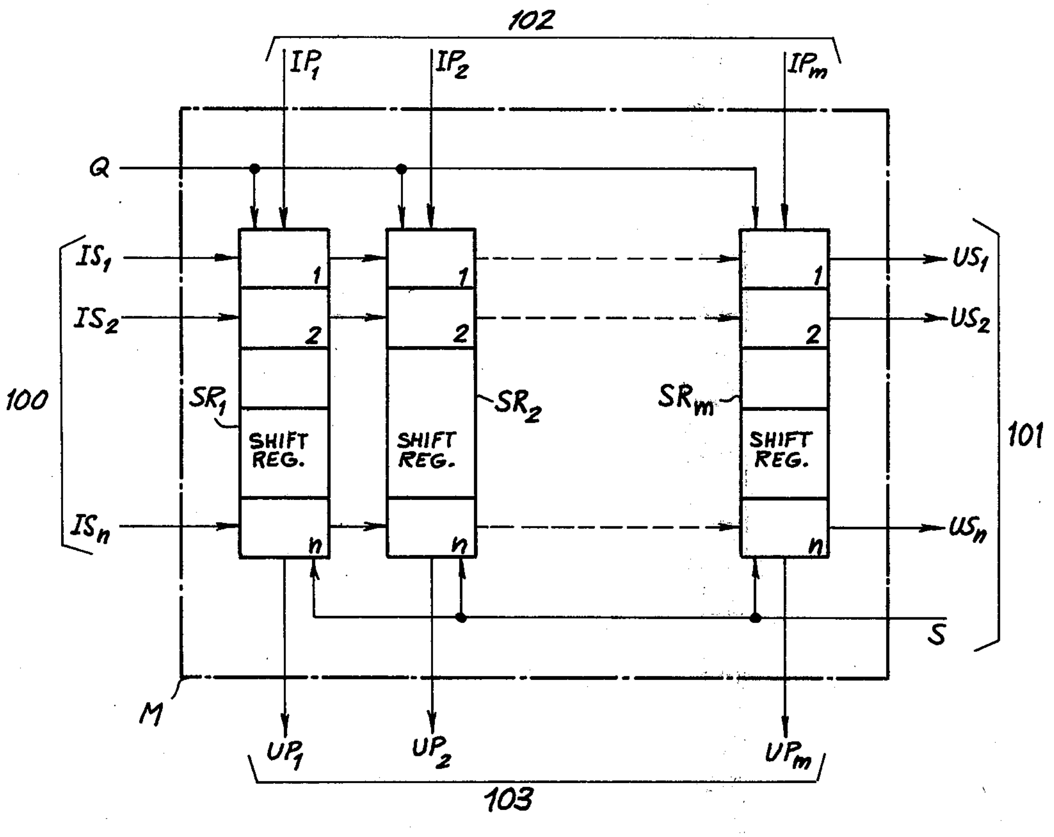
FIG. 2 is a detail view of a conversion unit included in the system of FIG. 1.

In FIG. 2 we have shown a unit M which is representative of either of the two conversion units M′ and M″ illustrated in FIG. 1. Unit M comprises an orthogonal matrix with *m* columns and *n* rows of bit-storing register stages, the stages of each column being combined for convenience into respective shift registers $SR_1$, $SR_2$, . . . $SR_m$. The column inputs of the unit, terminating at the first stages of all shift registers, are here designated $IP_1$, $IP_2$ . . . $IP_m$; the corresponding outputs, originating at the final register stages, are labeled $UP_1$, $UP_2$, . . . $UP_m$. The *n* row inputs $IS_1$, $IS_2$, . . . $IS_n$ serve to load the several stages of the first shift register $SR_1$; the stages of the last shift register $SR_m$ work into the respective row outputs $US_1$, $US_2$, . . . $US_n$. The interstage connections within the shift registers are conventional and have not been shown; those between the shift registers have been partly indicated at *h*. Transfer lead Q, when energized, enables all the register stages to receive and transmit bits in the horizontal direction, i.e. from the row-input side 100 of the matrix to its row-output side 101, or in the vertical direction, i.e. from the column-input side 102 of the matrix to its column-output side 103, depending on the energized or de-energized condition of switchover lead S which is representative of either of the leads S′, S″ of FIG. 1.

During a first switching phase, switch CM′ interconnects its contact multiples *f* and *g* (the term "contact" encompassing here the electrodes of transistors and similar electronic switching elements) whereas switch CM″ interconnects its contact multiples *a* and *c;* at the same time the energization of lead S′ and the concurrent de-energization of lead S″ conditions the conversion units M′ and M″ for horizontal and vertical transfer, respectively. In this phase, therefore, a sequence of *n* words of *m* bits is read from the transmitting lines IP of terminal CC via column inputs $IP_1''$ - $IP_m''$ into unit M″ while a similar sequence exits from column outputs $UP_1''$ - $UP_m''$ by way of switch CM′ into the receiving lines UP of that terminal. Simultaneously, a group of *n* words are fed from incoming channel branches $F_1$ – $F_n$ into row inputs $IS_1'$ – $IS_n'$ of unit M′ while a similar group are read out by way of row outputs $US_1'$ – $US_n'$ and switch CM″ into outgoing channel branches $OS_1$ – $OS_n$. In the second switching phase, conditions are reversed so that terminal CC transmits to and receives from unit M′ whereas the incoming and outgoing channel branches work into and are fed from unit M″. This has been illustrated graphically in FIG. 3 where the designations 100′ – 103′ and 100″ – 103″ denote the activities of the several input and output sides of units M′ and M″, respectively, in conformity with the referencing of these sides in FIG. 2; graph 3′ indicates the operation of unit M′ whereas graph 3″ relates to unit M″. In both graphs the activation of row inputs 100′, 100″ has been indicated by dashed lines, that of row outputs 101′, 101″ by dot-dash lines, that of column inputs 102′, 102″ by single solid lines and that of column outputs 103′, 103″ by double solid lines.

Figure 3:
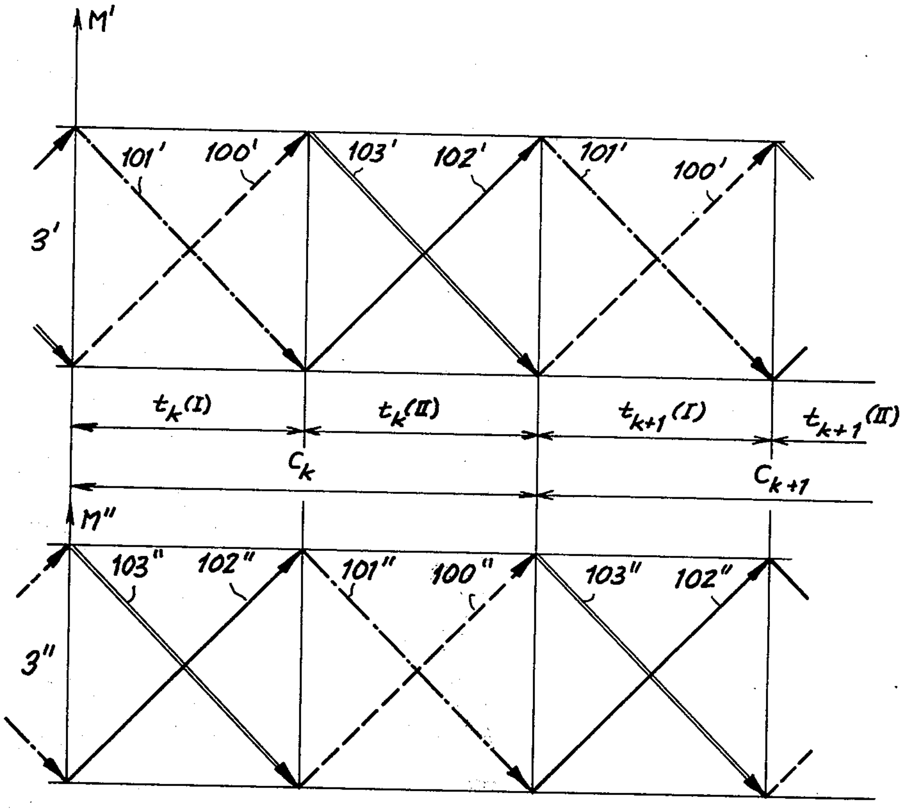
FIG. 3 is a set of graphs serving to explain the operation of the system.

The activities depicted in FIG. 3 take place during a switching cycle $C_k$ and an immediately following cycle $C_{k+1}$; each cycle is divided into a first switching phase $t_k$(I), $t_{k+1}$(I) and a second switching phase $t_k$(II), $t_{k+1}$(II).

In phase $t_k$(I), therefore, a group of newly arriving words from channel branches $F_1$ – $F_n$ are delivered via row-input side 100′ to unit M′ where the bits of each word are progressively loaded into assigned stages of shift registers $SR_1$ – $SR_m$, i.e. the first stage of each shift register in the case of channel branch $F_1$, the second stage in the case of channel branch $F_2$, and so forth. These incoming bits displace those previously stored in the matrix which are therefore serially read out to the outgoing channel branches $OS_1$ – $OS_n$, as a group of *n* parallel words, on the row-output side 101′ of this unit. Simultaneously, a sequence of *n* words coming from terminal CC is fed into the column-input side 102″ of unit M″, the bits of each word entering the first stages of the several shift registers $SR_1$ – $SR_m$ thereof at the same time and progressing through these shift registers until loading is completed. The previously stored bits are concurrently read out at the column-output side 103″ of unit M″ into terminal CC.

In the next phase $t_k$(II) the *n* words received by unit M′ from the incoming branch channels in the preceding phase are sequentially delivered to terminal CC by way of the column-output side 103′ of this unit even as another word sequence is delivered from terminal CC to the unit by its column-input side 102′. Simultaneously, unit M″ unloads the previously stored word sequence from terminal CC in parallel into the outgoing channel branch, via its row-output side 101″, while storing a new group of words from the incoming channel branches, arriving at its row-input side 100″, in the register stages thus vacated.

In the following phase $t_{k+1}$(I) the same setting prevails as in phase $t_k$(I) whereby the word sequence just stored in unit M′ is unloaded at 101′ into the outgoing channel branches and a fresh group of words from the incoming channel branches is loaded at 100′ into that unit whereas the previous word group stored in unit M″ is discharged at 103″ into the terminal CC and another word sequence from that terminal enters the unit M″ at 102″.

It will thus be seen that the two conversion units M′ and M″ process the incoming word groups from the local channels and word sequences from the TDM terminal without interruption and with the desired conversion and regrouping. It will also be evident that the number $m$ of shift registers and the number $n$ of register stages may be changed at will to accommodate different groups of channels as well as words of different length.

We claim:

1. In a pulse-code-modulation system with $n$ channels having incoming and outgoing branches each adapted to carry a succession of words of $m$ bits each traveling serially thereover, and with a time-division-multiplex terminal having $m$ receiving lines for the bits of a word from any of said incoming branches and $m$ transmitting lines for the bits of a word destined for any of said outgoing branches, the combination therewith of a multiplexing/demultiplexing network comprising:

a first and a second conversion unit each including an orthogonal matrix of $m \cdot n$ register stages for the storage of individual bits, said matrix being divided into $m$ columns and $n$ rows with respective inputs and outputs;

timing means establishing a continuous sequence of alternating first and second switching phases, the duration of each of said switching phases equaling the time period occupied by an $m$-bit word traveling on any of said channels;

switchover means controlled by said timing means and effective during each of said first switching phases to connect the $n$ row inputs of said first unit to the incoming branches and the $n$ row outputs of said first unit to the outgoing branches of said $n$ channels while connecting the $m$ column inputs of said second unit to said transmitting lines and the $m$ column outputs of said second unit to said receiving lines, said switchover means being effective during each of said second switching phases to connect the $m$ column inputs of said first unit to said transmitting lines and the $m$ column outputs of said first unit to said receiving lines while connecting the $n$ row inputs of said second unit to the incoming branches and the $n$ row outputs of said second unit to the outgoing branches of said $n$ channels; and transfer means in each of said units for serially reading out the $m$ bits stored in each row thereof to said outgoing branches concurrently with a progressive loading of the stages of said rows with the bits of a group of newly arriving words from said incoming branches during one of said switching phases and for serially reading out the $n$ bits of respective words stored in the columns thereof to said receiving lines concurrently with a progressive loading of the stages of said columns with corresponding bits of a sequence of $n$ words from said transmitting lines during the other of said switching phases.

2. The combination defined in claim 1 wherein said matrix consists of a multiplicity of parallel shift registers, said transfer means including connections between corresponding stages of said shift registers.

3. The combination defined in claim 2 wherein said timing means comprises a source of control pulses for said switchover means and selection pulses for said conversion units, each of said shift registers being responsive to a selection pulse for changing between conditions of bit transfer within and among said shift registers.

4. The combination defined in claim 3 wherein said timing means also comprises a source of clock pulses establishing simultaneous instants of bit transfer for all stages of the matrix.

5. The combination defined in claim 1 wherein said switchover means comprises a pair of electronic switches with $m$ and $n$ jointly switchable paths, respectively.

6. A method of combining a group of $n$ parallel words of $m$ bits each, serially arriving over incoming branches of $n$ channels within a recurrent time period of predetermined duration, into a sequence of words whose bits are fed in parallel to respective receiving lines of a time-division-multiplex terminal, and of concurrently distributing a sequence of $n$ words, each of $m$ bits appearing in parallel on respective transmitting lines of said terminal, to respective outgoing branches of said channels for serial transmission to individual destinations, comprising the steps of:

establishing a continuous succession of alternating first and second switching phases of a duration equaling said recurrent time period;

progressively storing the bits of arriving words from said incoming branches during said first switching phase in respective rows of register stages of a first orthogonal matrix having $n$ rows and $m$ columns of stages, and simultaneously reading out the bits previously stored in the rows of said first matrix into respective outgoing branches;

progressively storing corresponding bits of $n$ words sequentially delivered by said transmitting lines during said first switching phase in respective columns of register stages of a second orthogonal matrix having $n$ rows and $m$ columns of stages, and simultaneously reading out the bits previously stored in respective columns of said second matrix into said receiving lines; and reversing the roles of said first and second matrices in said second switching phase.

* * * * *